(12) United States Patent
Dos Santos

(10) Patent No.: US 6,184,332 B1
(45) Date of Patent: *Feb. 6, 2001

(54) POLYESTER POLYOLS AND THEIR USE AS THE POLYOL COMPONENT IN TWO-COMPONENT POLYURETHANE PAINTS

(75) Inventor: Antonio Manuel Dos Santos, Buxtehude (DE)

(73) Assignee: Synthopol Chemie Dr. rer. pol. Koch GmbH & Co. KG, Buxtehude (DE)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/101,626

(22) PCT Filed: Feb. 26, 1997

(86) PCT No.: PCT/EP97/00930

§ 371 Date: Jul. 10, 1998

§ 102(e) Date: Jul. 10, 1998

(87) PCT Pub. No.: WO97/31964

PCT Pub. Date: Sep. 4, 1997

(30) Foreign Application Priority Data

Feb. 29, 1996 (DE) .............................. 196 07 585

(51) Int. Cl.[7] .............................. C08G 18/34; B05D 3/02
(52) U.S. Cl. .............................. 528/81; 528/271; 528/272; 528/295.5; 528/296; 528/300; 528/301; 528/302; 528/307; 528/308; 528/308.6; 528/80; 528/83; 528/84; 528/85; 427/372.2; 427/385.5; 427/487
(58) Field of Search .............................. 528/271, 295.5, 528/272, 296, 300, 301, 302, 307, 308, 308.6, 361, 80, 81, 83, 84, 85; 427/487, 372.2, 385.5

(56) References Cited

U.S. PATENT DOCUMENTS

| | | |
|---|---|---|
| 3,993,655 | 11/1976 | Rasberger et al. . |
| 4,110,304 | 8/1978 | Gilg et al. . |
| 4,123,418 | 10/1978 | Gilg et al. . |
| 4,123,422 * | 10/1978 | Erikson et al. ................. 528/273 |
| 4,221,701 | 9/1980 | Rasberger et al. . |
| 4,801,675 * | 1/1989 | Pedain et al. .................. 528/73 |
| 4,816,325 | 3/1989 | Boretzky et al. . |
| 4,894,430 * | 1/1990 | Hohlein et al. ................ 528/75 |
| 5,331,039 * | 7/1994 | Blum et al. .................... 524/507 |
| 5,589,538 * | 12/1996 | Rex et al. ...................... 525/28 |
| 5,811,190 * | 9/1998 | Laas et al. .................... 428/423.1 |

FOREIGN PATENT DOCUMENTS

| | | |
|---|---|---|
| 2858096 | 4/1985 | (DE) . |
| 4001580 | 7/1991 | (DE) . |
| 4124167 | 1/1993 | (DE) . |
| 0036975 | 10/1981 | (EP) . |
| 0556793 | 8/1993 | (EP) . |
| 0705858 | 4/1996 | (EP) . |

OTHER PUBLICATIONS

"Lackkunstharze", by H. Wagner and H.F. Sarx; Carl Hanser Verlag, Munich 1971, pp. 86–152.
"Ullmanns Enzyklopadie Der Technishen Chemie" Verlag Chemie Weinheim, 4th Edition (1980), vol. 19, pages 61FF.

* cited by examiner

Primary Examiner—Samuel A. Acquah
(74) Attorney, Agent, or Firm—Horst M. Kasper

(57) ABSTRACT

The invention concerns novel polyester polyols and their use as the polyol component in two-component polyurethane paints. The polyester polyols produce films which display exceptional properties after hardening. Owing to the low solvent requirement when reaction paints are prepared, they are particularly environmentally friendly. The permanence of the gloss of the hardened coatings should be stressed in particular.

18 Claims, No Drawings

POLYESTER POLYOLS AND THEIR USE AS THE POLYOL COMPONENT IN TWO-COMPONENT POLYURETHANE PAINTS

The present invention relates to new polyesterpolyols based on selected starting materials and to their use in combination with paint polyisocyanates as binder or as binder component in two-component polyurethane coating materials in connection with the coating of metals, woods, paper and board and of polymer moldings. The object of the invention is to provide those new polyesterpolyols which meet the following requirements:

1. The new polyesterpolyols should allow the preparation of polyisocyanate-crosslinkable reactive coating materials having a markedly reduced solvent requirement, as called for in the environmental protection legislation currently in preparation, and especially in the automotive refinish sector. Drafts relating to this are already in existence. (European union of the associations of paint, printing-ink and artist's-colors manufacturers [CEPE] Technology guideline for vehicle refinishes [12.02.92]).
2. The new polyesterpolyols should be suitable as a binder component for polyisocyanate-crosslinkable clearcoats, or pigmented reactive coating materials for producing coatings on metals, woods, paper and board and on polymer moldings.
3. The coatings obtainable from reactive coating materials which comprise the new polyesterpolyols must undergo rapid physical drying at room temperature, for example, for wood varnishing, at about 60° C. for automotive refinishing and at about 80° C. for painting plastics.
4. So that the reactive coating materials which comprise the new polyesterpolyols are very diverse in terms of the possibilities for their use, chemical resistance and high mechanical resistance are absolutely necessary for the cured coating films obtained.
5. Relative to the existing polyesterpolyols for the same field of use, which usually comprise incorporated aromatic components, the new polyesterpolyols should allow the preparation of reactive coating materials whose coating films are notable for outstanding weathering stability, especially gloss retention and yellowing resistance.
6. The new polyesterpolyols should ideally be colorless in dissolved form, so that they can be used to prepare reactive coating materials which as clearcoats and white paints exhibit no intrinsic color.

It has long been known to coat various substrates with two-component polyurethane coating materials based on hydroxyl-containing polyesters, polyethers or polyacrylates and organic polyisocyanates. The resulting coatings are notable in particular for excellent hardness, very good adhesion and good weathering stability. The chemical foundations of these coating materials and coatings are described, inter alia, in "Lackkunstharze" [Synthetic coating resins] Hans Wagner/Hans Friedrich-Sarx, Carl Hanser Verlag, Munich, page 153 to 173, 1971.

The new coating system based on the new polyesterpolyols should in particular satisfy the following requirements:
1. Good gloss retention and yellowing resistance:
   The coating film in the case of automotive refinishing, for example, should not degrade more quickly than that of the original finish.
2. No after-embrittlement:
   The film must not undergo after-embrittlement even following prolonged weathering.
3. Low drying temperature:
   The required drying temperatures and times should be as low as possible, for various reasons including that of saving energy.
4. Reparability:
   The drying conditions of such a system should permit not only original finishing but also refinishing with drying at 60° C., 80° C. or room temperature.

As has now surprisingly been discovered, it is possible to achieve the required objects by using the polyesterpolyols of the invention, which are described in more detail below and are based on selected starting materials, as a polyhydroxyl component in two-component polyurethane coating materials.

The invention provides the polyesterpolyols as claimed in claims 1 to 12 and for their use as claimed in claims 13 to 15.

The invention provides polyesterpolyols having hydroxyl numbers of from 75 to 300, acid numbers of from 5 to 30 and stoichiometrically calculated molecular masses of from 600 to 15,000, synthesized from reaction products of
a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols from the group 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, individually or in a mixture,
f) from 0 to 18 mol-% of other dicarboxylic acids and/or hydroxydicarboxylic acids and/or the anhydride thereof, from the group 5-hydroxyisophthalic acid, isophthalic acid, terephthalic acid, halo acids, such as tetrachloro- and tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecane-dicarboxylic acid, endo-ethylenehexahydrophthalic acid, camphoric acid (1,2,2-trimethylcyclopentane-1,3-dicarboxylic acid), adipic acid, succinic acid, azelaic acid, sebacic acid, glutaric acid, individually or in a mixture,
g) from 0 to 16 mol-% of monocarboxylic acids and/or hydroxycarboxylic acids from the group benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, 2-,3-,4-hydroxybenzoic acid, 2-hydroxy-2-phenylpropionic acid, individually in a mixture,
h) from 0 to 14 mol-% of aliphatic and/or cycloaliphatic monoalcohols, the monoalcohols possessing 4 to 18 C atoms,
the molar percentages stated under a), b), c) and d), and if appropriate e), f), g) and h), in each case adding up to 100 mol-%.

One embodiment of the invention relates to polyesterpolyols having hydroxyl numbers of from 100 to 280, acid numbers of from 6 to 28 and stoichiometrically calculated molecular masses of from 750 to 12,000, synthesized from reaction products of
a) from 8 to 47 mol-% of neopentyl glycol,
b) from 8 to 42 mol-% of trimethylolpropane,
c) from 25 to 51 mol-% of hexahydrophthalic acid and/or its anhydride, d) from 1 to 27 mol-% of phthalic acid and/or its anhydride, the molar percentages stated under a), b), c) and d) in each case adding up to 100 mol-%.

Another embodiment of the invention constitutes polyesterpolyols having hydroxyl numbers of from 110 to 270, acid numbers of from 7 to 26 and stoichiometrically calculated molecular masses of from 750 to 10,000, synthesized from reaction products of
a) from 10 to 45 mol-% of neopentyl glycol,
b) from 10 to 40 mol-% of trimethylolpropane,
c) from 30 to 50 mol-% of hexahydrophthalic acid and/or its anhydride,
d) from 1 to 22 mol-% of phthalic acid and/or its anhydride, the molar percentages stated under a), b), c) and d) in each case adding up to 100 mol-%.

A further embodiment of the invention embraces polyesterpolyols having hydroxyl numbers of from 120 to 260, acid numbers of from 8 to 25 and stoichiometrically calculated molecular masses of from 780 to 8000, synthesized from reaction products of
a) from 12 to 43 mol-% of neopentyl glycol,
b) from 12 to 38 mol-% of trimethylolpropane,
c) from 32 to 50 mol-% of hexahydrophthalic acid and/or its anhydride,
d) from 1 to 17 mol-% of phthalic acid and/or its anhydride, the molar percentages stated under a), b), c) and d) in each case adding up to 100 mol-%.

Another embodiment of the invention includes polyesterpolyols having hydroxyl numbers of from 125 to 255, acid numbers of from 9 to 24 and stoichiometrically calculated molecular masses of from 800 to 7000, synthesized from reaction products of
a) from 14 to 41 mol-% of neopentyl glycol,
b) from 14 to 36 mol-% of trimethylolpropane,
c) from 35 to 49 mol-% of hexahydrophthalic acid and/or its anhydride,
d) from 2 to 12 mol-% of phthalic acid and/or its anhydride, the molar percentages stated under a), b), c) and d) in each case adding up to 100 mol-%.

Another embodiment of the invention is represented by polyesterpolyols having hydroxyl numbers of from 130 to 250, acid numbers of from 10 to 24 and stoichiometrically calculated molecular masses of from 800 to 6000, synthesized from reaction products of
a) from 15 to 40 mol-% of neopentyl glycol,
b) from 15 to 35 mol-% of trimethylolpropane,
c) from 36 to 48 mol-% of hexahydrophthalic acid and/or its anhydride,
d) from 2 to 7 mol-% of phthalic acid and/or its anhydride, the molar percentages stated under a), b), c) and d) in each case adding up to 100 mol-%.

A further embodiment of the invention embraces polyesterpolyols having hydroxyl numbers of from 130 to 250, acid numbers of from 10 to 24 and stoichiometrically calculated molecular masses of from 600 to 6000, synthesized from reaction products of
a) from 25 to 40 mol-% of neopentyl glycol,
b) from 18 to 28 mol-% of trimethylolpropane,
c) from 35 to 45 mol-% of hexahydrophthalic acid and/or its anhydride,
d) from 2 to 5 mol-% of phthalic acid and/or its anhydride, the molar percentages stated under a), b), c) and d) in each case adding up to 100 mol-%.

A special embodiment of the invention constitutes polyesterpolyols having hydroxyl numbers of from 75 to 250, acid numbers of from 10 to 24 and stoichiometrically calculated molecular masses of from 600 to 2600, synthesized from reaction products of
a) from 25 to 42 mol-% of neopentyl glycol,
b) from 5 to 28 mol-% of trimethylolpropane,
c) from 35 to 46 mol-% of hexahydrophthalic acid and/or its anhydride,
d) from 2 to 15 mol-% of phthalic acid and/or its anhydride, the molar percentages stated under a), b), c) and d) in each case adding up to 100 mol-%.

Another special embodiment of the invention embraces polyesterpolyols having hydroxyl numbers of from 180 to 250, acid numbers of from 10 to 20 and stoichiometrically calculated molecular masses of from 750 to 1500, synthesized from reaction products of
a) from 26 to 30 mol-% of neopentyl glycol,
b) from 26 to 30 mol-% of trimethylolpropane,
c) from 38 to 41 mol-% of hexahydrophthalic acid and/or its anhydride,
d) from 3 to 8 mol-% of phthalic acid and/or its anhydride, the molar percentages stated under a), b), c) and d) in each case adding up to 100 mol-%.

A further special embodiment of the invention relates to polyesterpolyols having hydroxyl numbers of from 80 to 260, acid numbers of from 8 to 25 and stoichiometrically calculated molecular masses of from 600 to 2600, synthesized from reaction products of
a) from 34 to 39 mol-% of neopentyl glycol,
b) from 12 to 22 mol-% of trimethylolpropane,
c) from 35 to 46 mol-% of hexahydrophthalic acid and/or its anhydride,
d) from 3 to 15 mol-% of phthalic acid and/or its anhydride, the molar percentages stated under a), b), c) and d) in each case adding up to 100 mol-%.

A further special embodiment of the invention is represented by polyesterpolyols having hydroxyl numbers of from 70 to 110, acid numbers of from 9 to 24 and stoichiometrically calculated molecular masses of from 1200 to 1800, synthesized from reaction products of
a) from 44 to 47 mol-% of neopentyl glycol,
b) from 4 to 10 mol-% of trimethylolpropane,
c) from 42 to 45 mol-% of hexahydrophthalic acid and/or its anhydride,
d) from 2 to 4 mol-% of phthalic acid and/or its anhydride, the molar percentages stated under a), b), c) and d) in each case adding up to 100 mol-%.

The invention also provides for the use of the polyesterpolyols of the abovementioned embodiments, alone or in a blend with other organic polyhydroxy compounds, as binder components for two-component polyurethane coating materials which comprise paint polyisocyanates and also, if desired, the additives and auxiliaries customary in polyurethane coatings technology, in connection with the production of coatings on metals, woods, paper and board and on polymer moldings.

In the case of the above use, the polymer moldings to be provided with coatings can be those as are used in automotive construction.

The use of the polyesterpolyols in reactive coating materials for producing coatings or primers takes place by mixing
(A) polyesterpolyols,
(B) if desired, other organic polyhydroxy compounds,
(C) polyisocyanates as hardeners,
(D) inert organic solvents and, if desired,
(E) further additives which are customary in reactive coating materials.

For producing coatings or primers, the use of the polyesterpolyols takes place by applying a coating material based on hydroxyl-bearing compounds, polyisocyanates, inert solvents and, if desired, customary additives to a support and curing the coating material at room temperature or at an elevated temperature up to 120° C.

It should also be noted that the cycloaliphatic dicarboyxlic acids can be employed not only in their cis form but also in their trans form and as a mixture of both forms. Also suitable are the esterifiable derivatives of the dicarboxylic acids, such as, for example, their mono- or polyesters with aliphatic alcohols having 1 to 4 C atoms or hydroxy alcohols having 1 to 4 C atoms. It is also possible to employ the anhydrides of the stated dicarboxylic acids, where they exist.

The particular suitability of the polyesterpolyols of the invention can be attributed to the selection, in accordance with the invention, of the starting materials on which the polyesterpolyols are based and on the proportion of the materials. The polyesterpolyols of the invention have hydroxyl numbers of 75, preferably from 80 to 300, acid numbers of from 5 to 30 and stoichiometrically calculated molecular masses of from 600 to 15,000. The polyesterpolyols of the invention are, in general, solid, colorless to pale yellow, clear resins which are soluble in inert paint solvents such as, for example, hydrocarbons, such as toluene, xylene, solvent naphtha or higher alkylbenzenes, esters, such as ethyl acetate, butyl acetate, ethoxypropyl acetate, ethoxyethyl propionate, ketones, such as methyl ethyl ketone or methyl isobutyl ketone, or mixtures thereof.

The polyesterpolyols of the invention are prepared in a manner known per se by methods as are described at length in, for example, "Ullmanns Enzyklopädie der technischen Chemie", Verlag Chemie Weinheim, 4th edition (1980), volume 19, pages 61 ff. or by H. Wagner and H. F. Sarx in "Lackkunstharze", Carl Hanser Verlag, Munich (1971), pages 86–152. The esterification takes place in the presence of an inert gas, for example nitrogen, in the presence or absence of a catalytic amount of a customary esterification catalyst such as, for example, acids, bases or transition metal compounds such as, for example, titanium tetrabutylate, at about 150–260° C. The esterification reaction is continued until the desired values for the hydroxyl and acid number have been reached. The molecular weight of the polyesterpolyols of the invention can be calculated from the stoichiometry of the starting materials (taking into account the resulting hydroxyl and acid numbers).

In the case of the use, according to the invention, of the polyesterpolyols of the invention, the latter are employed, alone or in a blend with other organic polyhydroxy compounds known from polyurethane coatings technology, as a polyhydroxy component. These other polyhydroxy compounds can be customary polyester-, polyether- or polyacrylate-polyols.

Preference is given as further organic polyhydroxy compounds—if such compounds are used at all in addition to the polyesterpolyols that are essential to the invention—to the use of the prior art polyacrylatepolyols that are known per se.

Polyacrylatepolyols which are suitable as a blend component are, for example, copolymers that are soluble in paint solvents of the type already mentioned by way of example, such copolymers being obtainable in accordance with DE-A 40 01 580, DE-A 41 24 167 or DE-A 28 58 096. The hydroxyl group content of these polyacrylatepolyols is generally between 2 and 5% by weight. In the case of the use according to the invention of the polyesterpolyols of the invention, the latter can be employed in a blend with up to 90, preferably up to 50, hydroxyl equivalent%, based on all polyhydroxy compounds, of other polyols of the type mentioned by way of example. With particular preference, however, the polyesterpolyols of the invention are employed as sole polyol component in the context of the use according to the invention.

The polyisocyanates which can be used to crosslink the polyesterpolyols of the invention are typical paint polyisocyanates. The proportion of polyisocyanate crosslinker is chosen such that there are from 0.5 to 1.5 isocyanate groups to one hydroxyl group of the binder mixture. Excess isocyanate groups may react as a result of moisture and contribute to the crosslinking. It is possible to use aliphatic, cycloaliphatic and aromatic polyisocyanates, such as hexamethylene diisocyanate, trimethylhexamethylene diisocyanate, isophorone diisocyanate, 4,4'-diisocyanatodicyclohexylmethane, tolylene2,4-diisocyanate, o-, m- and p-xylylene diisocyanate, 4,4'-diisocyanatodiphenylmethane; capped polyisocyanates, such as polyisocyanates capped with CH—, NH— or OH-acidic compounds; and also, for example, polyisocyanates containing biuret, allophanate, urethane or isocyanurate groups. Examples of such polyisocyanates are a reaction product, containing biuret groups, of 3 moles of hexamethylene diisocyanate with 1 mole of water, having an NCO content of about 22% (corresponding to the commercial product Desmodur N BAYER AG, registered trademark); a polyisocyanate containing isocyanate groups, which is prepared by trimerizing 3 moles of hexamethylene diisocyanate, having an NCO content of about 21.5% (corresponding to the commercial product Desmodur N 3390 BAYER AG, registered trademark) or polyisocyanates containing urethane groups, which constitute reaction products of 3 moles of tolylene diisocyanate and 1 mol of trimethylolpropane, having an NCO content of about 17.5%, (corresponding to the commercial product Desmodur L BAYER AG, registered trademark.)

Preference is given to the use of Desmodur N and Desmodur N3390, BAYER AG, registered trademark.

In the two-component polyurethane coating materials that are employed in connection with the use according to the invention, the polyol component and the polyisocyanate component are present in amounts corresponding to a ratio of equivalents of isocyanate groups to hydroxyl groups of from 2:1 to 1:2, preferably from 1.5:1 to 1:1.5. The two-component binders obtained by mixing the two components have only a limited processing time of from about 2 to 48 hours and are processed using the customary auxiliaries and additives. These auxiliaries and additives which are to be used if appropriate can be added either to the mixture or to the individual components prior to their mixing.

Examples of suitable auxiliaries and additives are inert solvents, such as, for example, ethyl acetate, butyl acetate, methyl ethyl ketone, methyl isobutyl ketone, ethoxypropyl acetate, methoxypropyl acetate, ethoxyethyl propionate, methoxybutyl acetate, butyl glycol acetate, toluene, xylene, solvent naphtha, white spirit or any desired mixtures of these solvents.

The solvents are used in an amount of up to 60, preferably up to 45% by weight, based on the overall mixture.

Further auxiliaries and additives to be used if desired are, for example, plasticizers such as, for example, tricresyl phosphate or phthalic diesters, chlorinated paraffins, pigments and fillers, such as titanium oxide, barium sulfate, chalk, carbon black; catalysts such as, for example, N,N-dimethylbenzylamine, N-methylmorpholine, lead octoate or dibutyltin dilaurate; leveling agents; thickeners, optionally stabilizers, such as substituted phenols, organofunctional silanes. Adhesion promoters and light stabilizers are, for example, sterically hindered amines, as are described, inter alia, in DE-A 2 417 353 (=U.S. Pat. Nos. 4,123,418 and 4,110,304) and DE-A 2 456 864 (=U.S. Pat. Nos. 3,993,655 and 4,221,701). Particularly preferred compounds are: bis(1,2,2,6,6-pentamethylpiperid-4-yl) sebacate, bis(2,2,6,6-tetramethylpiperid-4-yl) sebacate, bis(1,2,2,6,6-pentamethylpiperid-4-yl) n-butyl-(3,5-di-tert-butyl-4-hydroxybenzyl)malonate.

The moisture adhering to the fillers and pigments can be removed by drying beforehand or by concomitant use of water-absorbing substances such as, for example, molecular sieve zeolites.

The drying of the paint films resulting in the case of the use according to the invention can take place at room temperature and requires no increase in temperature in order to achieve the optimum properties mentioned at the outset. Drying at room temperature, which takes place relatively quickly, can be further accelerated by increasing the temperature to from about 60 to 120° C., preferably from 60 to 80° C., for a period of from 20 to 40 minutes. A higher drying temperature and hence a shortening of the stoving process, although possible, is nevertheless inadvisable in the case of many substrates such as polymer parts, woods, paper and board.

The reactive coating materials employed in accordance with the invention are particularly suitable for the coating of metals, woods, paper, board and plastics, but also for other substrates. The reactive coating materials employed in accordance with the invention are suitable with particular advantage for the coating of metals as are used in automotive construction and in industry. Because of the equal suitability of the reactive coating materials employed in accordance with the invention for plastics and metals, these coating materials are also, in particular, outstandingly suitable for the painting of structures such as, for example, exterior automotive components produced, in the modern mixed construction manner, from plastic parts and metal parts. The particular advantages of the coating materials employed in accordance with the invention favor this "on line" coating, especially of exterior automotive components, since the curing of the paint films can take place even at low temperatures, so that the plastics are not subjected to any excessive temperature stress, and since the resulting paint films are of excellent weathering stability, so that decorative coatings remain unchanged for a long period and withstand collision or impact stresses without damage. Also deserving of particular emphasis in this context is the excellent stone-chip resistance of automotive topcoats produced in accordance with the invention. The paint films obtained with the two-component coating materials employed in accordance with the invention provide optimum fulfillment of two inherently contradictory demands, namely a low molecular mass and the associated saving of solvents, with high gloss retention at the same time.

The reactive coating materials employed in accordance with the invention can be applied by all customary methods of coating technology, such as brushing, spraying or dipping, to the substrates that are to be coated. The reactive coating materials of the invention are suitable both for producing primers and for producing intermediate coats, as well as for producing topcoats on the substrates to be painted.

The polyesterpolyols of the invention, in the form of 70% strength solutions in butyl acetate, generally give viscosities (measured in accordance with DIN 53019 at 23° C.) of from 500 to 6000 mpa*s, preferably from 700 to 4000 mpa*s.

The best embodiments of the polyesterpolyols of the invention are illustrated by Examples 1, 3.2 and 3.3 below.

The examples which follow serve to illustrate the invention.

EXAMPLE 1

| Polyesterpolyol formed from | |
|---|---|
| 2.5 mol of neopentyl glycol | 260.5 g |
| 1.5 mol of trimethylolpropane | 201.3 g |
| 3.0 mol of hexahydrophthalic anhydride | 462.6 g |

The above mixture was heated under nitrogen at 190 to 220° C. and the water of reaction formed was removed continually. Over the course of 5 to 10 hours the temperature was raised continuously to 220° C. until the acid number had fallen to 15 to 25. After cooling to 160° C., 0.25 mol of phthalic anhydride 37.025 g was added and the mixture was heated under nitrogen to 190 to 220° C., and the water of reaction formed was removed continually. Over the course of 1 to 5 hours the temperature was raised continuously to 220° C. until the acid number had fallen to 10 to 25. After cooling, the reaction product is in solid form. By adding 380 g of butyl acetate the product is diluted to a nonvolatile content of about 70%.

Multiple repetition of the reaction gave the following values for the polyesterpolyols.

| Experiments | 1 | 2 | 3 | 4 | 5 |
|---|---|---|---|---|---|
| Hydroxyl number (DIN 53240) mg of KOH/g of solid resin | 195 | 194 | 193 | 194 | 195 |
| Acid number (DIN 53402) mg of KOH/g of solid resin | 16.1 | 16.3 | 15.5 | 17.7 | 18.9 |
| Viscosity (DIN 53019) in mpa*s at 23° C./supply form | 1190 | 1050 | 1110 | 1070 | 1040 |
| Nonvolatile content (DIN 53216) in %/1 h at 125° C. | 70.1 | 70.0 | 70.2 | 70.0 | 70.2 |

The polyesterpolyol consists of 55.17 mol-% polyols and 44.83 mol-% dicarboxylic acid.

EXAMPLE 2 WITH COMPARISON

White paint based on a polyesterpolyol of Example 1 of earlier German Patent Application 195 370 26/75% in butyl acetate/Shellsol A (1:2) as comparison and polyesterpolyol of the invention, Example 1, 70% strength in butyl acetate.

| | Polyesterpolyol of the invention, Example 1, 70% strength in butyl acetate | Polyesterpolyol of Patent Application 19 537 026, Example 1 Dissolved 75% in butyl acetate/Shellsol A 1:2 |
|---|---|---|
| Resin | 25.00 | 25.00 |
| Kronos titanium dioxide 2160 | 29.00 | 29.00 |
| Bentone 38 10% strength in | 1.50 | 1.50 |

-continued

| | Polyester-polyol of the invention, Example 1, 70% strength in butyl acetate | Polyester-polyol of Patent Application 19 537 026, Example 1 Dissolved 75% in butyl acetate/ Shellsol A 1:2 |
|---|---|---|
| xylene + 4% Anti Terra U | | |
| Byk 160 30% strength | 3.75 | 3.75 |
| Butyl acetate | 6.00 | 10.60 |
| Shellsol A | 1.80 | 1.80 |
| 30 min. beadmill 1:1 with beads | | |
| Resin | 18.90 | 16.00 |
| Byk 344 10% strength in xylene | 2.00 | 2.00 |
| Byketol OK | 3.00 | 3.00 |
| Butyl acetate | 9.05 | 10.35 |
| Total weight | 100.00 | 103.00 |
| Desmodur N 3390 | 23 | 18 |
| NVC at 21 sec., DIN 53216, 1 g initial weight | 70.3% | 66% |
| Density g/ml | 1.24 | 1.24 |
| VOC content (g solvent/l coating material) | 368.28 | 421.6 |
| Pot life in sec. immediate | 21 | 22 |
| after 2 hours | 24 | 27 |
| after 4 hours | 27 | 35 |
| after 6 hours | 35 | 47 |
| after 8 hours | 43 | 78 |
| Pendulum hardness on glass, 40 μm dry film, 150 μm wet film, in sec. | | |
| 30 min. at 60° C. + 1 h | 13 | 13 |
| 30 min. at 60° C. + 1 d | 136 | 68 |
| 30 min. at 80° C. + 1 h | 138 | 103 |
| 30 min. at 80° C. + 1 d | 175 | 110 |
| Air drying after 1 d | 75 | 23 |
| after 4 d | 173 | 55 |
| after 5 d | 183 | 58 |
| after 18 d | 183 | 118 |
| Steel panels with conventional surfacer, white paint, 60 min., 80° C. + 19 d | | |
| Coat thickness, surfacer, in μm | 33–35 | 35–36 |
| Coat thickness, topcoat, in μm | 55–58 | 50–60 |
| Pendulum hardness in sec. | 173 | 149 |
| Erichsen indentation in mm | 6.8 | 4.8 |
| Gloss 60° angle in % | 93.8 | 93.3 |
| Adhesion Gt | 0 | 0 |
| 5 min. xylene resistance | satisf. | satisf. |
| 5 min. super-grade gasolene resistance | satisf. | satisf. |
| QUV test (313 nm) on phosphated aluminum panels, 60 min., 80° C. + 3 h | | |
| 0 value 20° | 87% | 85% |
| after 500 h | 83% | 85% |
| after 1000 h | 80% | 82% |
| after 1500 h | 73% | 75% |
| 0 value 60° angle | 94% | 93% |
| 500 h | 93% | 93% |
| 1000 h | 92% | 92% |
| 1500 h | 90% | 91% |

From the above tabular values for Example 2 with comparison it is found that the white paints based on a polyesterpolyol of the invention, according to Example 1, in conjunction with Desmodur N 3390 as hardener and crosslinker according to Example 2, surprisingly possess outstanding properties in various directions.

For instance, the measured nonvolatiles content (in accordance with DIN 53216) at the processing viscosity of 21 sec. is 70.3% by weight. The comparison coating material in accordance with the earlier but not yet published German Patent Application 19 537 026, which comprises polyesterpolyols having excellent properties, already possesses very considerable, but far less than 66% by weight, nonvolatiles contents.

Even more marked is the difference in the comparison values when the VOC (volatile organic compounds) content is considered (g solvent/l coating material), which according to the invention is 368.28 g and in the case of the comparison is 421.6 g; in other words, the coating material of the invention requires 53.32 g less solvent per liter of coating material. Even now the coating material of the invention meets without problems the VOC rules proposed by the CEPE from 1998, and with from 40 to 60 g less solvent, coupled with markedly quicker drying, is superior to commercial high-solids coating materials.

The pot lives found for the reactive coating materials likewise indicate more advantageous values for the invention, which are of importance for practical processing, especially in the case of large objects.

A comparative consideration of the pendulum hardness (surface hardness) shows surprisingly improved values for the coating material of the invention.

Further tests have shown that the polyesterpolyols of the invention have diverse possibilities for use in the furniture, industry and motor vehicle (including air, rail and road transport) sector for clearcoats and pigmented topcoats, primers and surfacers.

A point of particular note is the outstanding weathering stability of the coatings produced in accordance with the invention, which no commercial product can match in terms of gloss retention and yellowing resistance (color retention). The invention offers, surprisingly, considerable advantages in comparison, in particular, with the acrylate resins, which in qualitative terms are estimated much more highly.

With the coatings according to the invention, quick-drying films are obtained at a customary 40 μm dry film coat thickness.

Since the polyesterpolyols are obtained by melt condensation, they are free from solvents, so that they can optionally be diluted with any organic solvent appropriate for the intended use.

Examples 3.1 to 3.10 illustrate the preparation of ready-to-use polyesterpolyols with different molecular masses, hydroxyl numbers and viscosities. The preparation methods correspond to Example 1.

EXAMPLES 3.1 TO 3.10

| Experiments Raw materials | 3.1 mol-% | 3.2 mol-% | 3.3 mol-% | 3.4 mol-% | 3.5 mol-% |
|---|---|---|---|---|---|
| Neopentyl glycol | 26.67 | 29.33 | 38.22 | 34.48 | 44.93 |
| Trimethylolpropane | 26.67 | 26.67 | 19.74 | 20.69 | 7.97 |
| Hexahydrophthalic anhydride | 40 | 40 | 38.22 | 38.62 | 43.48 |
| Phthalic anhydride | 6.66 | 4 | 3.82 | 6.21 | 3.62 |
| Calculated molecular weight | 1320 | 780 | 620 | 890 | 1300 |
| Data | | | | | |
| Nonvolatiles content (DIN 53216) | 70% | 80% | 80% | 70% | 80% |
| Solvent | Buac | Buac | Buac | Buac | Buac |

-continued

| Experiments Raw materials | 3.1 mol-% | 3.2 mol-% | 3.3 mol-% | 3.4 mol-% | 3.5 mol-% |
|---|---|---|---|---|---|
| viscosity (DIN 53019) at 23° C., diluted 70% in butyl acetate, in mPas | 2960 | 1130 | 660 | 1200 | 1000 |
| Acid number (DIN 53402) mg of KOH/g of solid resin | 13.1 | 18.6 | 18.9 | 16.6 | 17 |
| Hydroxyl number (DIN 53240) mg of KOH/g | 190 | 240 | 250 | 202 | 105 |

Buac = butyl acetate

| Experiments Raw materials | 3.6 mol-% | 3.7 mol-% | 3.8 mol-% | 3.9 mol-% | 3.10 mol-% |
|---|---|---|---|---|---|
| Neopentyl glycol | 37.54 | 46.11 | 36.02 | 36.02 | 37.59 |
| Trimethylolpropane | 13.66 | 5.54 | 17.24 | 17.15 | 12.77 |
| Hexahydrophthalic anhydride | 45.05 | 44.63 | 43.14 | 43.23 | 35.46 |
| Phthalic anhydride | 3.75 | 3.72 | 3.6 | 3.6 | 14.18 |
| Calculated molecular weight | 2000 | 1640 | 1230 | 1240 | 2500 |
| Data |  |  |  |  |  |
| Nonvolatiles content (DIN 53216) | 80% | 80% | 70% | 80% | 70% |
| Solvent | Buac | Buac | Buac | Buac | Buac |
| Viscosity (DIN 53019) at 23° C., diluted 70% in butyl acetate, in mPas | 1990 | 1160 | 1050 | 1400 | 3800 |
| Acid number (DIN 53402) mg of KOH/g of solid resin | 19.5 | 20 | 18.1 | 16.7 | 18.4 |
| Hydroxyl number (DIN 53240) mg of KOH/g | 100 | 75 | 150 | 150 | 81 |

Buac = butyl acetate

EXAMPLES 4.1 TO 4.3

White paints based on the polyesterpolyols of Examples 3.2–3.4

| Coating examples | 4.1 | 4.2 | 4.3 |
|---|---|---|---|
| Polyesterpolyols | 3.4 | 3.2 | 3.3 |
| Resin | 25.00 | 25.00 | 25.00 |
| Kronos titanium dioxide 2160 | 29.00 | 29.00 | 29.00 |
| Bentone 38 10% strength in xylene + 4% Anti Terra U | 1.50 | 1.50 | 1.50 |
| Byk 160 30% strength | 3.75 | 3.75 | 3.75 |
| Butyl acetate | 6.00 | 10.00 | 10.00 |
| Shellsol A | 1.80 | 1.80 | 1.80 |
| 30 min. beadmill 1:1 with beads |  |  |  |
| Resin | 18.90 | 13.40 | 13.40 |
| Byk 344 10% strength in xylene | 2.00 | 2.00 | 2.00 |
| Byketol OK | 3.00 | 3.00 | 3.00 |
| Butyl acetate | 9.05 | 10.55 | 10.55 |
| Total weight | 100.00 | 100.00 | 100.00 |
| Desmodur N 3390 | 23 | 29 | 29 |
| Diluent solution | 0.8 |  |  |
| NVC, DIN 53216, 1 g | 69.5% | 70.8% | 70.2% |

White paints based on the polyesterpolyols of Examples 3.2–3.4

| Coating examples | 4.1 | 4.2 | 4.3 |
|---|---|---|---|
| Polyesterpolyols | 3.4 | 3.2 | 3.3 |
| initial weight Density g/ml | 1.24 | 1.24 | 1.24 |
| VOC content at measured NVC (g solvent/l coating material) | 378.20 | 362.08 | 369.52 |
| Pot life in sec. immediate | 22 | 21 | 18.5 |
| after 2 hours | 26 | 24 | 21 |
| after 4 hours | 32 | 28 | 24 |
| after 6 hours | 42 | 34 | 29 |
| after 8 hours | 48 | 48 | 41 |
| Pendulum hardness on glass, 40 μm dry film, in sec. |  |  |  |
| 30 min. at 60° C. + 1 h | 24 | 7 | 7 |
| 30 min. at 60° C. + 1 d | 163 | 152 | 156 |
| 30 min. at 80° C. + 1 h | 168 | 134 | 137 |
| 30 min. at 80° C. + 1 d | 210 | 203 | 190 |
| Air drying after 1 d | 63 | 83 | 80 |
| after 2 d | 146 | 190 | 173 |
| after 3 d | 163 | 196 | 185 |
| after 4 d | 173 | 218 | 202 |
| after 7 d | 178 | 220 | 220 |
| Steel panels with commercial surfacer, 60 min. 80° C. + 1 d |  |  |  |
| Coat thickness, surfacer, in μm | 48–55 | 42–53 | 45–52 |
| Coat thickness, topcoat, in μm | 51–52 | 68–75 | 58–68 |
| Pendulum hardness in sec. | 173 | 152 | 156 |
| Erichsen indentation in mm | 5.8 | 9.2 | 9.3 |
| Gloss 60° angle in % | 94 | 93 | 93 |
| Adhesion Gt | 0 | 0 | 0 |
| 5 min. xylene resistance | almost satisf. | satisf. | satisf. |
| 5 min. super-grade gasolene resistance | satisf. | satisf. | satisf. |
| QUV test (313 nm) on phosphatized aluminum panels 60 min. 80° C. + 3 h | 60°/20° | 60°/20° | 60°/20° |
| 0 value | 94%/87% | 93%/86% | 93%/86% |
| after 500 h | 94%/85% | 91%/75% | 89%/66% |
| after 1000 h | 93%/81% | 75%/38% | 66%/22% |

Diluent solution=ethoxypropyl acetate 25; butyl acetate 25, Shellsol A 20, xylene 25, butoxyl 5 (numbers denote % by weight)

From the above tabular values it is found that the white paints based on the polyesterpolyols 3.2, 3.3 and 3.4 of the invention, in conjunction with Desmodur N 3390 as hardener and crosslinker, surprisingly possess outstanding properties in various directions.

For instance, the measured nonvolatiles content (in accordance with DIN 53216) at the processing viscosity of 18.5 to 22 sec. is 69.5–70.8% by weight. Good commercial products for the intended use have nonvolatiles contents of only 45–60% by weight.

Even more marked is the difference from commercial products when the VOC is considered, which according to the invention is 362–378 g in Examples 4.1–4.3. In commercial products, the VOC is 500–700 g; in other words, the coating material used according to the invention requires at least 120 g less solvent per liter of coating material and thus even now meets without problems the VOC rules proposed by the CEPE from 1998, and with from 40 to 120 g less solvent, coupled with markedly quicker drying, is considerably superior to good commercial high-solids coating materials.

The pot lives found for the reactive coating materials used likewise indicate more advantageous values, which are of importance for practical processing, especially in the case of large objects.

A comparative consideration of the pendulum hardness (surface hardness) shows surprisingly improved values for the coating materials used in accordance with the invention relative to good commercial high-solids resins.

The white paint of Example 4.1 based on the polyesterpolyol 3.4 offers surprisingly good gloss stabilities, in comparison with good commercial products, these stabilities even being superior to those of acrylate resins which to date have been more highly prized.

EXAMPLES 5.1 TO 5.3

White paints based on the polyesterpolyols of Examples 3.5, 3.6 and 3.10.

| Coating examples | 5.1 | 5.2 | 5.3 |
|---|---|---|---|
| Polyesterpolyols | 3.10 | 3.6 | 3.5 |
| Resin | 30.00 | 30.00 | 30.00 |
| Kronos titanium dioxide 2160 | 31.50 | 31.50 | 31.50 |
| Bentone 38 10% strength in xylene + 4% Bykumen | 2.00 | 2.00 | 2.00 |
| Silicone oil LO 50 1% xylene | 0.50 | 0.50 | 0.50 |
| Calcium (4%) naphthenate | 0.50 | 0.50 | 0.50 |
| Xylene | 0.00 | 6.00 | 6.00 |
| Shellsol A | 12.30 | 7.00 | 7.00 |
| 30 min. beadmill 1:1 with beads | | | |
| Resin | 19.70 | 13.50 | 13.50 |
| Byk 300 10% strength in xylene | 2.00 | 2.00 | 2.00 |
| Butyl acetate | 1.50 | 7.00 | 7.00 |
| Total weight | 100.00 | 100.00 | 100.00 |
| Desmodur N 3390 | 11 | 13 | 13 |
| Diluent solution | 18.5 | 9.5 | 4.5 |
| NVC, DIN 53216, 1 g initial weight | 60.8% | 65.7% | 68.0% |
| Density g/ml | 1.23 | 1.24 | 1.24 |
| VOC content at measured NVC (g solvent/l coating material) | 482.16 | 425.32 | 396.80 |
| Pot life in sec. immediate | 25 | 25 | 25 |
| after 2 hours | 29 | 38 | 38 |
| after 4 hours | 37 | 47 | 48 |
| after 6 hours | 50 | 70 | 68 |
| after 8 hours | 55 | 108 | 85 |
| Pendulum hardness on glass, 40 μm dry film, in sec. | | | |
| 30 min. at 60° C. + 1 h | 18 | 23 | 21 |
| 30 min. at 60° C. + 1 d | 92 | 82 | 85 |
| 30 min. at 80° C. + 1 h | 152 | 140 | 134 |
| 30 min. at 80° C. + 1 d | 172 | 165 | 154 |
| Air drying after 1 d | 20 | 22 | 18 |
| after 2 d | 31 | 34 | 25 |
| after 5 d | 35 | 35 | 25 |
| after 6 d | 40 | 38 | 27 |
| after 12 d | 44 | 44 | 31 |
| Steel panels with single-coat finish, 60 min. 80° C. + 1 d | | | |
| Coat thickness, topcoat, in μm | 70–75 | 80–87 | 70–76 |
| Pendulum hardness in sec. | 101 | 70 | 92 |
| Erichsen indentation in mm | 9.8 | 10.6 | >11 |
| Gloss 60° angle in % | 92 | 92 | 91 |
| Adhesion Gt | 0 | 0 | 0 |
| 5 min. diesel resistance | satisf. | satisf. | satisf. |
| 5 min. super-grade gasolene resistance | not satisf. | not satisf. | not satisf. |
| QUV test (313 nm) on phosphatized aluminum panels | 60°/20° | 60°/20° | 60°/20° |

-continued

White paints based on the polyesterpolyols of Examples 3.5, 3.6 and 3.10.

| Coating examples | 5.1 | 5.2 | 5.3 |
|---|---|---|---|
| Polyesterpolyols | 3.10 | 3.6 | 3.5 |
| 60 min. 80° C. + 1 d | | | |
| 0 value | 92%/85% | 92%/85% | 91%/80% |
| after 500 h | 82%/55% | 77%/43% | 43%/8% |

From the above tabular values it is found that the white paints according to Examples 5.1 to 5.3 based on the polyesterpolyols 3.5, 3.6 and 3.10 of the invention, in conjunction with Desmodur N 3390 as hardener and crosslinker, surprisingly possess outstanding properties in various directions.

For instance, the measured nonvolatiles content (in accordance with DIN 53216) at the processing viscosity of 25 sec. is 60.8–68% by weight. Good commercial products for the intended use have nonvolatiles contents of 40–54% by weight.

An even more marked leap in environmental and coatings technology is obtained when the VOC (g solvent/l coating material) is considered, which according to the invention in Examples 5.1–5.3 is considerably reduced at 397–482 g. In good commercial products, the VOC is 575–750 g; in other words, the coating material of the invention requires at least 90 g less solvent per liter. As a result, the coating materials of Examples 5.2 and 5.3 used in accordance with the invention already meet the VOC regulations proposed by the CEPE as from 1998.

The pot lives found for the reactive coating materials used likewise indicate more advantageous values, which are of importance for practical processing, especially in the case of large objects.

The white paint based on the polyesterpolyol 3.10 offers surprisingly good gloss stabilities, in comparison with good commercial products.

EXAMPLES 6.1 TO 6.3

Clearcoats based on the polyesterpolyols of Examples 3.9, 1 and 3.8.

| Clearcoat example | 6.1 | 6.2 | 6.3 |
|---|---|---|---|
| Polyesterpolyols | 3.9 | 1 | 3.8 |
| Resin | 61.25 | 61.25 | 61.25 |
| Ethoxypropyl acetate | 8.00 | 8.00 | 8.00 |
| DBTL 1% in xylene | 0.50 | 0.50 | 0.50 |
| Shellsol A | 10.00 | 10.00 | 10.00 |
| Butyl acetate | 8.75 | 8.75 | 8.75 |
| Byk 300 10% strength in xylene | 2.00 | 2.00 | 2.00 |
| Xylene | 7.00 | 7.00 | 7.00 |
| Tinuvin 1130 | 1.50 | 1.50 | 1.50 |
| Tinuvin 292 | 1.00 | 1.00 | 1.00 |
| Total weight | 100.00 | 100.00 | 100.00 |
| Desmodur N 3390 | 28 | 37 | 28 |
| Diluent solution | 11 | 12 | 9 |
| NVC at 21 sec., DIN 53216, 1 g initial weight | 58.2% | 61.3% | 58.4% |
| Density g/ml | 1.00 | 1.00 | 1.00 |
| VOC content (g solvent/l coating material) | 418.00 | 387.00 | 416.00 |
| Pot life in sec. immediate | 21 | 21 | 21 |
| after 2 hours | 24 | 27 | 25 |

-continued

Clearcoats based on the polyesterpolyols of Examples 3.9, 1 and 3.8.

| Clearcoat example | 6.1 | 6.2 | 6.3 |
|---|---|---|---|
| Polyesterpolyols | 3.9 | 1 | 3.8 |
| after 4 hours | 30 | 34 | 30 |
| after 6 hours | 38 | 45 | 40 |
| after 8 hours | 52 | 65 | 53 |
| Pendulum hardness on glass, 200 μm wet film, in sec. | | | |
| 30 min. at 60° C. + 1 h | 8 | 11 | 13 |
| 30 min. at 60° C. + 1 d | 82 | 102 | 100 |
| 30 min. at 80° C. + 1 h | 110 | 135 | 155 |
| 30 min. at 80° C. + 1 d | 175 | 178 | 193 |
| Air drying after 1 d | 14 | 20 | 17 |
| after 4 d | 49 | 98 | 65 |
| after 5 d | 54 | 100 | 66 |
| after 6 d | 59 | 100 | 68 |
| after 7 d | 62 | 103 | 73 |
| after 11 d | 66 | 103 | 68 |
| QUV test (313 nm) on phosphatized aluminum panels and commercial topcoat + clearcoat 60 min. 80° C. + 1 d | 60°/20° | 60°/20° | 60°/20° |
| 0 value | 92%/85% | 93%/87% | 92%/85% |
| after 500 h | 92%/85% | 91%/86% | 92%/85% |
| after 1000 h | 92%/85% | 90%/85% | 92%/85% |

From the above tabular values it is found that the clearcoats according to Examples 6.1 to 6.3 based on the polyesterpolyols 1, 3.8 and 3.9 of the invention, in conjunction with Desmodur N 3390 as hardener and crosslinker, likewise surprisingly possess outstanding properties in various directions.

For instance, the measured nonvolatiles content at the processing viscosity (4 mm flow cup DIN 53211) of 21 sec. is 58.2–61.3% by weight. Good commercial products for the same intended use have nonvolatiles contents of 45–54% by weight.

An even more considerable and unexpected progression is obtained when the VOC (g/solvent/l coating material) is considered, which according to the invention in Examples 6.1–6.3 is 387–418 g. In good commercial products, the VOC is 460–550 g; in other words, the coating material used according to the invention requires at least 52 g less solvent per liter. As a result, the coating materials of Examples 6.1–6.3 already meet the VOC regulations proposed by the CEPE as from 1998. Relative to good commercial high-solids coating materials, the reactive coating materials used in accordance with the invention require 40 to 100 g less solvent, thereby demonstrating a considerable advantageous effect.

The pot lives found for the reactive coating materials likewise indicate more advantageous values for the invention, which are of importance for practical processing, especially in the case of large objects.

The clearcoats according to Examples 6.1 to 6.3 based on the polyesterpolyols 1, 3.8 and 3.9 offer surprisingly good gloss stabilities.

The hydroxyl numbers and acid numbers given in the description and in the claims relate to mg of KOH/g of solid resin.

What is claimed is:

1. A polyesterpolyol having hydroxyl numbers of from 75 to 300, acid numbers of from 5 to 30 and stoichiometrically calculated molecular masses of from 600 to 15,000, synthesized from the reaction products of a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof,
f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, tetrachlorophthalic acid, tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof,
g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 2-,3-hydroxy-4-methylbenzoic acid, 2-,3-,4-hydroxybenzoic acid, 2-hydroxy-2-phenylpropionic acid, and mixtures thereof,
h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%.

2. A polyesterpolyol as claimed in claim 1, having hydroxyl numbers of from 80 to 300, acid numbers of from 5 to 30 and stoichiometrically calculated molecular masses of from 700 to 1500.

3. A polyesterpolyol having hydroxyl numbers of from 100 to 280, acid numbers of from 6 to 28 and stoichiometrically calculated molecular masses of from 750 to 12,000, synthesized from reaction products of a) from 8 to 47 mol-% of neopentyl glycol,
b) from 8 to 42 mol-% of trimethylolpropane,
c) from 25 to 51 mol-% of hexahydrophthalic acid and/or its anhydride,
d) from 1 to 27 mol-% of phthalic acid and/or its anhydride, the molar percentages stated under a), b), c) and d) in each case adding up to 100 mol-%.

4. A polyesterpolyol having hydroxyl numbers of from 110 to 270, acid numbers of from 7 to 26 and stoichiometrically calculated molecular masses of from 750 to 10,00, synthesized from reaction products of a) from 10 to 45 mol-% of neopentyl glycol, b) from 10 to 40 mol-% of trimethylolpropane, c) from 30 to 50 mol-% of hexahydrophthalic acid and/or its anhydride, d) from 1 to 22 mol-% of phthalic acid and/or its anhydride, the molar percentages stated under a), b), c) and d) in each case adding up to 100 mol-%.

5. A polyesterpolyol having hydroxyl numbers of from 120 to 260, acid numbers of from 8 to 25 and stoichiometrically calculated molecular masses of from 780 to 8000, synthesized from reaction products of a) from 12 to 43 mol-% of neopentyl glycol, b) from 12 to 38 mol-% of trimethylolpropane, c) from 32 to 50 mol-% of hexahydrophthalic acid and/or its anhydride, d) from 1 to 17 mol-% of phthalic acid and/or its anhydride, the molar percentages stated under a), b), c) and d) in each case adding up to 100 mol-%.

6. A polyesterpolyol having hydroxyl numbers of from 125 to 255, acid numbers of from 9 to 24 and stoichiometrically calculated molecular masses of from 800 to 7000, synthesized from reaction products of a) from 14 to 41 mol-% of neopentyl glycol, b) from 14 to 36 mol-% of trimethylolpropane, c) from 35 to 49 mol-% of hexahydrophthalic acid and/or its anhydride, d) from 2 to 12 mol-% of phthalic acid and/or its anhydride, the molar percentages stated under a), b), c) and d) in each case adding up to 100 mol-%.

7. A polyesterpolyol having hydroxyl numbers of from 130 to 250, acid numbers of from 10 to 24 and stoichiometrically calculated molecular masses of from 800 to 6000, synthesized from reaction products of a) from 15 to 40 mol-% of neopentyl glycol, b) from 15 to 35 mol-% of trimethylolpropane, c) from 36 to 48 mol-% of hexahydrophthalic acid and/or its anhydride, d) from 2 to 7 mol-% of phthalic acid and/or its anhydride, the molar percentages stated under a), b), c) and d) in each case adding up to 100 mol-%.

8. A polyesterpolyol having hydroxyl numbers of from 130 to 250, acid numbers of from 10 to 24 and stoichiometrically calculated molecular masses of from 600 to 6000, synthesized from reaction products of a) from 25 to 40 mol-% of neopentyl glycol, b) from 18 to 28 mol-% of trimethylolpropane, c) from 35 to 45 mol-% of hexahydrophthalic acid and/or its anhydride, d) from 2 to 5 mol-% of phthalic acid and/or its anhydride, the molar percentages stated under a), b), c) and d) in each case adding up to 100 mol-%.

9. A polyesterpolyol having hydroxyl numbers of from 75 to 250, acid numbers of from 10 to 24 and stoichiometrically calculated molecular masses of from 600 to 2600, synthesized from reaction products of a) from 25 to 42 mol-% of neopentyl glycol, b) from 5 to 28 mol-% of trimethylolpropane, c) from 35 to 46 mol-% of hexahydrophthalic acid and/or its anhydride, d) from 2 to 15 mol-% of phthalic acid and/or its anhydride, the molar percentages stated under a), b), c) and d) in each case adding up to 100 mol-%.

10. A polyesterpolyol having hydroxyl numbers of from 180 to 250, acid numbers of from 10 to 20 and stoichiometrically calculated molecular masses of from 750 to 1500, synthesized from reaction products of a) from 26 to 30 mol-% of neopentyl glycol, b) from 26 to 30 mol-% of trimethylolpropane, c) from 38 to 41 mol-% of hexahydrophthalic acid and/or its anhydride, d) from 3 to 8 mol-% of phthalic acid and/or its anhydride, the molar percentages stated under a), b), c) and d) in each case adding up to 100 mol-%.

11. A polyesterpolyol having hydroxyl numbers of from 80 to 260, acid numbers of from 8 to 25 and stoichiometrically calculated molecular masses of from 600 to 2600, synthesized from reaction products of a) from 34 to 39 mol-% of neopentyl glycol, b) from 12 to 22 mol-% of trimethylolpropane, c) from 35 to 46 mol-% of hexahydrophthalic acid and/or its anhydride, d) from 3 to 15 mol-% of phthalic acid and/or its anhydride, the molar percentages stated under a), b), c) and d) in each case adding up to 100 mol-%.

12. A polyesterpolyol having hydroxyl numbers of from 70 to 110, acid numbers of from 9 to 24 and stoichiometrically calculated molecular masses of from 1200 to 1800, synthesized from reaction products of a) from 44 to 47 mol-% of neopentyl glycol, b) from 4 to 10 mol-% of trimethylolpropane, c) from 42 to 45 mol-% of hexahydrophthalic acid and/or its anhydride, d) from 2 to 4 mol-% of phthalic acid and/or its anhydride, the molar percentages stated under a), b), c) and d) in each case adding up to 100 mol-%.

13. A method for producing binder components for two component polyurethane coating material comprising the steps:

mixing a polyesterpolyol having a hydroxyl number of from 75 to 300, acid numbers of from 5 to 30 and stochiometrically calculated molecular masses of from 600 to 15,000, synthesized from the reaction products of a) from 5 to 50 mol-% of neopentyl glycol, b) from 5 to 45 mol-% of trimethylolpropane, c) from 20 to 51.5 mol-% of hexahydrophthalic acid and/or its anhydride, d) from 0.5 to 32 mol-% of phthalic acid and/or its anhydride, e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopenthyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof, f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, tetrachlorophthalic acid, tetrabromophthalic acid, tetrahydrophthalic acid, 1,2- cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof, g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, 2-,3-,4-hydroxybenzoic acid, 2-hydroxy-2-phenylpropionic acid, and mixtures thereof, h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%; and paint polyisocyanates and also, if desired, the additives and auxiliaries customary in polyurethane coatings technology, in connection with the preparation of coatings on metals, woods, paper, and board and on polymer moldings.

14. A method for generating reactive coating materials for producing coatings or primer coats comprising the step of: mixing (A) a polyesterpolyol having hydroxyl numbers of from 75 to 300, acid numbers of from 5 to 30 and stochiometrically calculated molecular masses of from 600 to 15,000, synthesized from the reaction products of
a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof,
f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, tetrachlorophthalic acid, tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof, g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, 2-,3-,4-hydroxybenzoic acid, 2-hydroxy-2-phenylpropionic acid, and mixtures thereof, h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%, (B) if desired, other organic polyhydroxy compounds, (C) polyisocyanates as hardeners, (D) inert organic solvents and, if desired, (E) further additives customary in reactive coating materials.

15. A method for producing coatings or primer coats comprising the step of:

applying a coating material based on hydroxyl bearing compounds, polyisocyanates, inert solvents and, if desired, customary additives to a support and curing the coating material at room temperature or at an elevated temperature up to 120° C.; and using polyesterpolyol having hydroxyl numbers of from 75 to 300, acid numbers of from 5 to 30 and stochiometrically calculated molecular masses of from 600 to 15,000, synthesized from the reaction products of
a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof,
f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, tetrachlorophthalic acid, tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof,
g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, 2-,3-,4-hydroxybenzoic acid, 2-hydroxy-2-phenylpropionic acid, and mixtures thereof, h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%, in connection with the applying step.

16. A method for producing coatings or primer coats comprising the step of:

employing a proportion of polyisocyanate crosslinker having from 0.5 to 1.5 isocyanate groups to one hydroxyl group in a binder mixture, mixing polyesterpolyol having hydroxyl numbers of from 75 to 300, acid numbers of from 5 to 30 and stochiometrically calculated molecular masses of from 600 to 15,000, synthesized from the reaction products of
a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof,
f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, tetrachlorophthalic acid, tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof,
g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, 2-,3-,4-hydroxybenzoic acid, 2-hydroxy-2-phenylpropionic acid, and mixtures thereof,
h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%, and polyisocyanate;

reacting excess isocyanate groups with moisture;

contributing to the crosslinking with isocyanate groups having reacted with moisture;

using a polyisocyanate selected from the group consisting of aliphatic polyisocyanates, cycloaliphatic polyisocyanates, capped polyisocyanates, and mixtures thereof.

17. A method for producing coatings or primer coats comprising the step of:

employing a proportion of polyisocyanate crosslinker having from 0.5 to 2 isocyanate groups to one hydroxyl group in a binder mixture, mixing polyesterpolyol having hydroxyl numbers of from 75 to 300, acid numbers of from 5 to 30 and stochiometrically calculated molecular masses of from 600 to 15,000, synthesized from the reaction products of
a) from 5 to 50 mol-% of neopentyl glycol,
b) from 5 to 45 mol-% of trimethylolpropane,
c) from 20 to 51.5 mol-% of hexahydrophthalic acid and/or its anhydride,
d) from 0.5 to 32 mol-% of phthalic acid and/or its anhydride,
e) from 0 to 18 mol-% of other alkanediols selected from a member of the group consisting of 1,2-, 1,3-, 1,4-butanediol, 1,5-pentanediol, 1,6-hexanediol, cyclohexane-1,4-dimethanol, neopentyl glycol hydroxypivalate, cyclohexanediol, trimethylpentanediol, ethylbutylpropanediol, ethylene glycol, diethylene glycol, triethylene glycol, 1,2-propanediol, dipropylene glycol, and mixtures thereof,
f) from 0 to 18 mol-% of other dicarboxylic acids and/or hydroxydicarboxylic acids and/or the anhydride thereof, selected from a member of the group consisting of 5-hydroxyisophthalic acid, isophthalic acid, terephthalic acid, halo acid, tetrachlorophthalic acid, tetrabromophthalic acid, tetrahydrophthalic acid, 1,2-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid (1,2,2-trimethylcyclopentane-1,3-dicarboxylic acid), adipic acid, succinic acid, azelaic acid, sebacic acid, glutaric acid, and mixtures thereof,
g) from 0 to 16 mole-% of monocarboxylic acids and/or hydroxycarboxylic acids selected from a member of the group consisting of benzoic acid, p-tert-butylbenzoic acid, lauric acid, isononanoic acid, 2,2-dimethylpropionic acid, 2-ethylhexanoic acid, caproic acid, caprylic acid, capric acid, Versatic acid, hexahydrobenzoic acid, hydroxypivalic acid, 3-,4-hydroxybenzoic acid, 2-,3-hydroxy-4-methylbenzoic acid, $_2$-,3-,4-hydroxybenzoic acid, 2-hydroxy-2-phenylpropionic acid, and mixtures thereof,
h) from 0 to 14 mol-% of aliphatic and/or cycloaliphatic monoalcohols, the monoalcohols possessing 4 to 18 C atoms, the molar percentages stated under a), b), c), and d), and if appropriate e), f), g), and h), in each case adding up to 100 mol-%, and polyisocyanate;

applying the mixture obtained within a processing time of from about 2 to 48 hours.

18. The polyesterpolyol according to claim 1, wherein the halo acid is selected from a member of the group consisting of tetrachlorophthalic acid, tetrabromophthalic acid and mixtures thereof.

* * * * *